March 21, 1967      E. N. PRICE      3,310,257
DROGUE FOR AIRSPEED-CALIBRATION TRAILING STATIC SOURCE
Filed Oct. 1, 1965
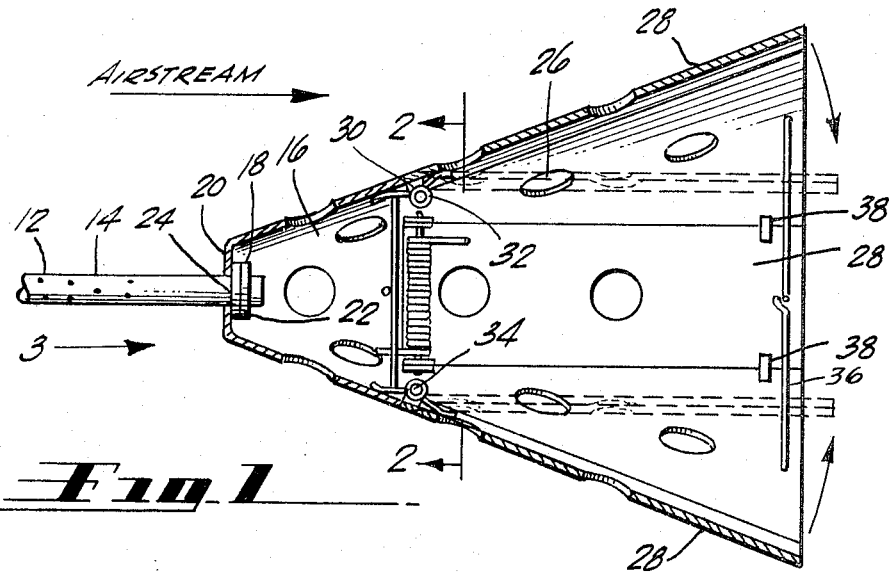
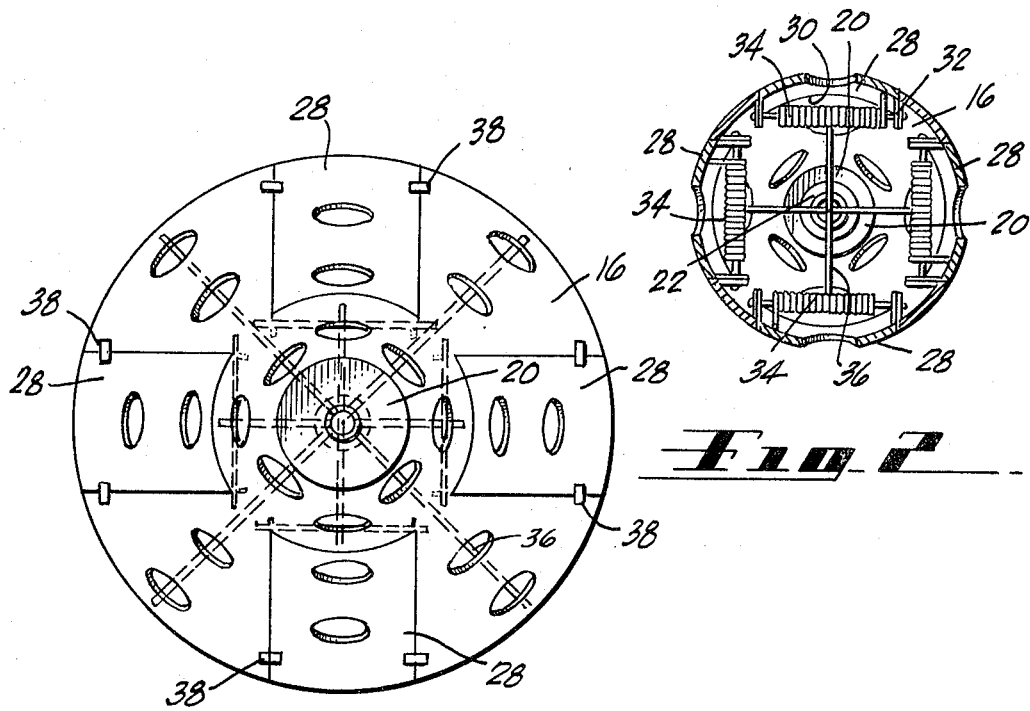
INVENTOR.
ELDON N. PRICE
BY Robert O. Richardson
-ATTORNEY-

United States Patent Office 3,310,257
Patented Mar. 21, 1967

3,310,257
DROGUE FOR AIRSPEED-CALIBRATION TRAILING STATIC SOURCE
Eldon N. Price, Omaha, Nebr., assignor to Douglas Aircraft Company, Inc., Santa Monica, Calif.
Filed Oct. 1, 1965, Ser. No. 492,094
5 Claims. (Cl. 244—1)

This invention relates generally to a drogue for an aircraft, airspeed-calibration, trailing, static source and more particularly to a modified drogue of the type disclosed in co-pending application Ser. No. 100,616 filed April 4, 1961 which issued Oct. 26, 1965 as Patent No. 3,214,115 for Trailing Static Source for Airspeed Calibration, of which this application is a continuation-in-part.

The device disclosed in said co-pending application is designed to sense static atmospheric pressures in moving aero-space craft or airplanes for the purpose of calibrating systems in the craft which employ static pressures as a reference parameter. The device is embodied in a flexible and reelable, small-diameter conductor, which is terminated at its rear end by a drogue member or drag cone. The flexible conductor is wound at its forward portion on a reel which may be mounted inside an aircraft fuselage. A series of static pickup apertures is located on the conductor ahead of the drag cone a distance of about 6 to 8 times the largest diameter of the cone. The drag cone is preferably entirely hollow and of frusto-conical shape. It is normally housed subjacent the fuselage with the hose reeled in. The drag cone tensions the conductor and constrains it to lie closely adjacent the fuselage at its front end. At a predetermined airspeed the cone becomes active and can itself unwind the conductor to an aft-trailing position and automatically aligns the conductor with the airstream. Power means may also be employed to unreel the conductor. The cone is rendered stable by means of orifices so shaped and located about its periphery that they destroy laminar flow around the cone, thus obviating air-pressure imbalance on the cone. The cone moves neither up, down, nor sidewise during flight, so that it introduces no inaccuracies in the pickup. However, to accomplish this, the frontal area of the cone must fall within a predetermined range in size for a particular range of speeds of the aircraft. Satisfactory operation at supersonic speeds and/or high dynamic pressure requires less frontal area than operation at very low speeds. Accordingly, heretofore it has been necessary to manufacture one size of cone for high-speed operation and another size of cone for low-speed operation.

The drag cone of the present invention, on the other hand, has a variable frontal area which is automatically reduced at increased air speeds permitting the use of a single cone and obviating the need for high and low speed cones.

Accordingly, it is a primary object of the present invention to provide a new and useful variable drag cone which constitutes a modification of the drag cone described in co-pending application Ser. No. 100,616, filed April 4, 1961.

Another object of the present invention is to provide a variable drag cone of the type described having a frontal area which is reduced in size at increased airspeeds.

Another object of the present invention is to provide a drag cone of the type described having retractable segments which automatically retract to reduce the frontal area of the cone at increased airspeeds.

Another object is the provision of a variable drag cone for applying sufficient tension on the conductor to which it is attached to insure that the conductor is straight, is aligned with and is stabilized in the free stream air flow, essential requirements for accurate measurement of static pressure.

According to the present invention, a variable drag cone is rotatably connected to the trailing end of an aircraft, airspeed-calibration, static pickup source. The cone is substantially frusto-conical in shape, is hollow and is provided with a plurality of orifices. The orifices are distributed around the conical surface of the cone in alternating groups and stabilize the cone when it is trailed behind a moving aircraft.

A plurality of retractable segments are equally spaced about the periphery of the cone. The segments are connected to the cone by hinges and are biased into engagement with restraining tabs mounted on the cone so that the segments will normally lie flush with the remaining portion of the sidewall of the cone. The bias of the coil springs is such that the segments will retract inwardly toward the center of the cone to reduce the frontal area thereof at increased air speeds. Cross support members are mounted inside the cone to support the coil springs and to prevent the cone from collapsing.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view, with parts broken away, of one form of variable drag cone;

FIG. 2 is a rear end view taken along the line 2—2 of FIG. 1; and

FIG. 3 is a front end view.

Referring now to FIG. 1 there is shown a flexible and reelable pressure conductor consisting of tubing 12 which extends from an aircraft or space vehicle, not shown, into free air. This conductor tubing has a length on the order of 150 feet, in the typical case, so that its end may be at a distance of 1 to 1½ fuselage lengths behind the aircraft. At this distance a reading can be taken at a point substantially undisturbed by the passage of the aircraft through the air. Chrome molybdenum steel tubing of .140" O.D. and .100" I.D. has the tensile strength of 800# that is required for this use. Any material that retains its tubular shape, that is flexible and has a high tensile strength may be used. Fiberglass, plastic or other metallic or non-metallic materials are also suitable for this purpose. Because of the small diameter of the tube, and because of its great length, the tube itself does not disturb the air surrounding it sufficiently to destroy accurate readings of pressure. This tube has suitable openings 14 near the end thereof as taught in my co-pending patent application No. 100,616, filed Apr. 4, 1961, entitled, Trailing Static Source for Air Speed Calibration.

These openings 14 typically are spaced forwardly from the trailing cone 16 a distance of about 6½ times the cone diameter. With a 10" diameter cone this distance would be about 65 inches. The openings in each row of openings are rotated 30° around the periphery from the openings in an adjacent row, spaced therefrom approximately two inches apart. These openings may be made with a #70 drill and are burr free.

In order to prevent kinking, to prevent vertical and horizontal oscillations which would destroy the accuracy of pressure pickup, and to permit automatically unreeling of the tube when such is desired, a drag cone 16 is fixed to the end of tubing 12. This drag cone 16 provides the trailing tube 12 and maintaining the tube in equilibrium close to the fuselage when not in use. This cone 16 is substantially frusto-conical in shape, is typically 10" in diameter, has a 16" peak and is 12" to the cone end 20.

It preferably is of .040 sheet material. Collar 18 on the inside of cone end 20 is an anti-friction thrust bearing, the rear portion 22 of which is attached to tube 12.

In order to stabilize the cone and tube a plurality of apertures are provided in the cone, preferably in alternating groups of 3 and 4 apertures each, extending laterally from front to rear of the cone. These apertures 26 are preferably 1 inch in diameter in a 12 inch long cone and are longitudinally spaced apart 3 inches on 45° semi-quadrantal center lines. Thus, unbalancing flow cannot occur on the drogue.

The trailing cone 16 has a given frontal area against which air must pass as the cone trails the moving vehicle through space. There is a relationship between this frontal area and the speed at which the cone may be moved through the atmosphere without excessive drag and the cone creating harmful turbulent air effects which would affect the reading. In order to reduce this frontal area to permit higher speeds without harmful effects, the cone walls have inwardly depressible segments 28 which are hingedly mounted at their front edge 30 by hinges 32 to the immovable portion of the cone structure. A coil spring 34 of conventional construction is used to outwardly urge the segments and against which the force of the air must overcome in deflecting inwardly these segments. Cross supports 36 retain the non-movable portions of the cone walls from collapsing rearwardly of the hinge 32. Segments 28 of necessity causes a weakening of the structure, requiring this reinforcing means extending across the cone walls between segments 28 and rearwardly on said cone. To avoid excessive outward movement of the segments under the influence of coil spring 34 when the cone is traveling at low speed, restraining tabs 38 are used.

When segments 28 are fully retracted, the frontal area on a typical design is reduced approximately 30%. This reduction in area permits an approximately 20% increase in useful range in high speed operation. Thus, instead of using two cones, one for high speed and one for low speed, a single cone may be used that has both capabilities.

No attempt is made to confine the invention to the size of the frontal area or the speeds at which the cone may be moved through space or the tension of the coil spring to urge the segments into frontal area position. The versatility and manipulation and functioning of the device is apparent from the foregoing description. This cone is inherently capable of use on any type of airplane or space vehicle and functions accurately at all speeds.

Although certain specific shapes, dimensions, etc., have been set forth herein, the invention itself is not limited in its scope thereby, it being of a nature defined in the appended claims.

I claim:

1. A drogue for an airspeed-calibration trailing static source comprising:
    a cone,
    a conductor tubing,
    said cone being attached to the end of said tubing,
    said cone having immobile portions and inwardly depressible segments connected therebetween to thereby reduce the frontal area of said cone in passage through space at relatively high speeds,
    said depressible segments being urged outwardly to conform to the configuration of said cone to provide a full maximum frontal area of said cone in passage through space at relatively lower speeds.

2. A drogue for an airspeed-calibration trailing static source comprising:
    a cone,
    a conductor tubing,
    said cone being swivelly attached to the end of said tubing,
    said cone having a plurality of apertures in the walls thereof,
    said cone having inwardly depressible segments in said walls to thereby reduce the frontal area of said cone in passage through space at relatively high speeds,
    said depressible segments being urged outwardly to conform to the configuration of said cone to provide a full maximum frontal area of said cone in passage through space at relatively lower speeds, and
    said segments being hingedly connected to immobile portions of said cone.

3. A drogue for an airspeed-calibration trailing static source comprising:
    a cone,
    a conductor tubing,
    said cone being swivelly attached to the end of said tubing,
    said cone having a plurality of apertures in the walls thereof,
    said cone having inwardly depressible segments between immobile segments in said walls to thereby reduce the frontal area of said cone in passage through space at relatively high speeds, and
    said depressible segments having resilient means for urging said segments outwardly to conform to the configuration of said cone to provide a full maximum frontal area of said cone in passage through space at relatively lower speeds.

4. A drogue for an airspeed-calibration trailing static source comprising:
    a cone,
    a conductor tubing,
    said cone being swivelly attached to the end of said tubing,
    said cone having a plurality of apertures in the walls thereof,
    said cone having inwardly depressible segments hingedly mounted in said walls to thereby reduce the frontal area of said cone in passage through space at relatively high speeds,
    said depressible segments being urged outwardly to conform to the configuration of said cone to provide a full maximum frontal area of said cone in passage through space at relatively lower speeds, and
    tab means on said segments to limit outward movement thereof.

5. A drogue for an airspeed-calibration trailing static source comprising:
    a cone,
    a conductor tubing,
    said cone being swivelly attached to the end of said tubing,
    said cone having a plurality of apertures in the walls thereof,
    said cone having inwardly depressible segments spaced about said cone and in said walls thereof to thereby reduce the frontal area of said cone in passage through space at relatively high speeds,
    said depressible segments being urged outwardly to conform to the configuration of said cone to provide a full maximum frontal area of said cone in passage through space at relatively lower speeds, and
    reinforcing means diametrically extending across said cone walls between said segments and rearwardly on said cone to prevent inward deflection of those portions of said cone between said segments.

References Cited by the Examiner

UNITED STATES PATENTS

| | | | |
|---|---|---|---|
| 2,317,622 | 4/1943 | Lear | 244—1 |
| 2,693,700 | 11/1954 | Osborne | 73—182 |
| 3,214,115 | 10/1965 | Price | 244—1 |

FERGUS S. MIDDLETON, *Primary Examiner.*